United States Patent [19]
Fitzgerald

[11] Patent Number: 5,844,171
[45] Date of Patent: Dec. 1, 1998

[54] ENVIRONMENTALLY ENCLOSED CABLE SPLICE

[75] Inventor: Frank J. Fitzgerald, Cary, N.C.

[73] Assignee: MeV Corporation, Raleigh, N.C.

[21] Appl. No.: 837,689

[22] Filed: Apr. 22, 1997

[51] Int. Cl.[6] .................................................. H02G 15/113
[52] U.S. Cl. ........................................ 174/92; 174/138 F
[58] Field of Search .................. 174/92, 138 F, 174/77 R; 439/367, 687

[56] References Cited

U.S. PATENT DOCUMENTS

| | | |
|---|---|---|
| 3,183,302 | 5/1965 | Wochner et al. . |
| 3,879,575 | 4/1975 | Dobbin et al. . |
| 4,084,067 | 4/1978 | Gillemot . |
| 4,181,814 | 1/1980 | Smith . |
| 4,295,005 | 10/1981 | Daugherty et al. . |
| 4,337,374 | 6/1982 | Smith . |
| 4,358,634 | 11/1982 | Dienes . |
| 4,538,021 | 8/1985 | Williamson, Jr. . |
| 4,570,032 | 2/1986 | Charlebois et al. . |
| 4,692,564 | 9/1987 | Cambell et al. . |
| 4,831,215 | 5/1989 | Clark et al. . |
| 4,837,409 | 6/1989 | Klosin . |
| 4,924,034 | 5/1990 | Truesdale et al. . |
| 4,935,582 | 6/1990 | Calligaris . |
| 5,001,300 | 3/1991 | Meselhi . |
| 5,055,636 | 10/1991 | Jaycox . |
| 5,099,088 | 3/1992 | Usami et al. . |
| 5,129,839 | 7/1992 | VanSkiver ............................ 439/367 |
| 5,132,495 | 7/1992 | Ewing et al. . |
| 5,217,387 | 6/1993 | Hull et al. ............................ 439/367 |
| 5,245,133 | 9/1993 | DeCarlo et al. . |
| 5,387,763 | 2/1995 | Messelhi . |
| 5,397,859 | 3/1995 | Robertson et al. ..................... 174/92 |
| 5,440,666 | 8/1995 | Burek et al. . |
| 5,456,959 | 10/1995 | Dawes . |
| 5,525,073 | 6/1996 | Sampson . |
| 5,561,269 | 10/1996 | Robertson et al. . |

OTHER PUBLICATIONS

3M. "Cold Shrink Jacket Kits SJ–1A, SJ–2A & SJ–3A", 1989.
Raychem. "15–35kV URD Cable (Jacketed & Unjacketed Concentric Neutral Cable)" Mar. 1993.
MeV Corporation "CS–1550 Installation Instructions", Sep. 1995.

*Primary Examiner*—Kristine Kincaid
*Assistant Examiner*—Chau N. Nguyen
*Attorney, Agent, or Firm*—Richard S. Faust

[57] ABSTRACT

An environmentally enclosed splice is provided for two joined jacketed cables that carry distribution class voltage. The enclosed splice includes a molded elongate housing that has two mirror image clam-type housing halves that are closed over the cable splice around a living hinge. The splice is protected from the environment by a continuous, uninterrupted mastic seal that fully envelops the splice and seals to the jacketed cables extending from each end of the splice.

13 Claims, 5 Drawing Sheets

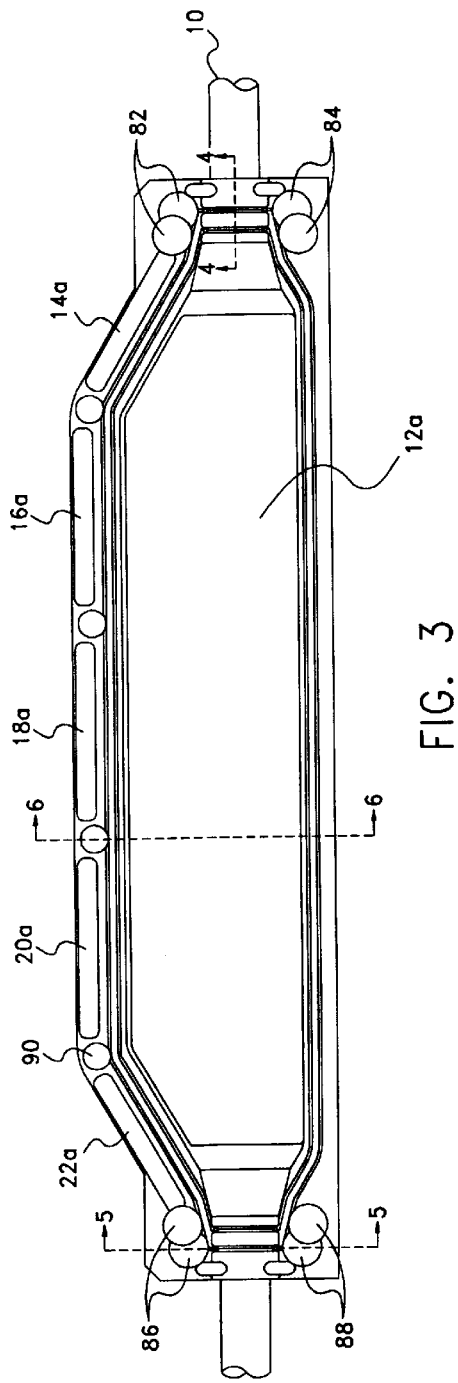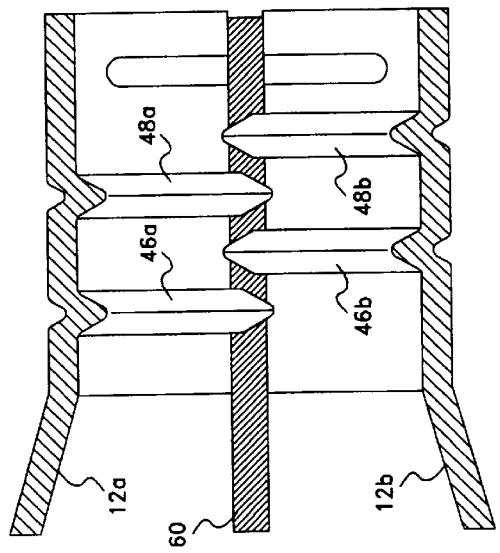

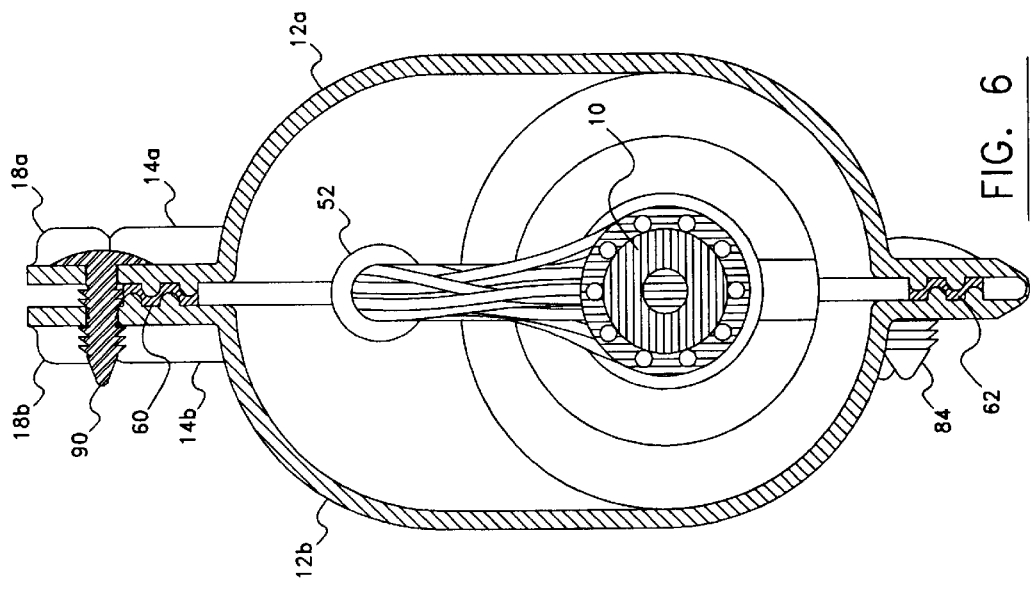
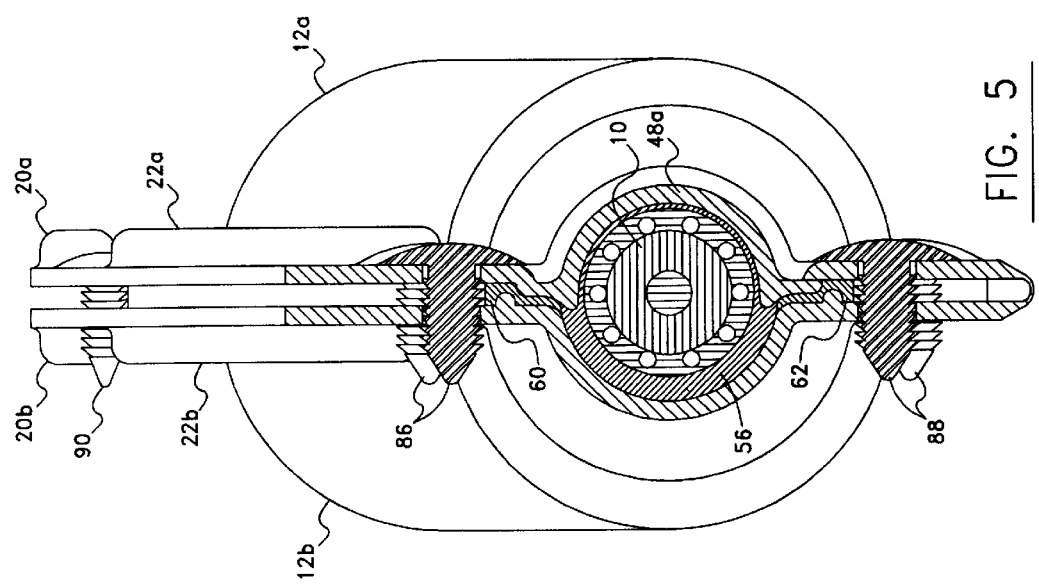

ENVIRONMENTALLY ENCLOSED CABLE SPLICE

FIELD OF THE INVENTION

This invention relates to environmentally and physically enclosing spliced or window stripped jacketed cable and pertains more specifically to moisture-resistant enclosures for such cables.

BACKGROUND OF THE INVENTION

Electrical and telecommunication utilities frequently use underground cable in their distribution systems. These cables have various functions that can vary from acting as a waveguide for beams of light to conductors of electricity for the conveyance of power. Most of these cables have an environmental sealing and mechanically robust layer, referred to as a jacket or sheath that covers the functional part of the cable (such as optical glass fibers or medium voltage shielded power cable). The cable jacket is continuous from termination point to termination point unless field conditions prevent the installation of a contiguous run of cable and a cable splice is required. The cable splice must rebuild the cable to allow uninterrupted transfers of light, electrical signals, power or whatever function the original cable provided. In addition, the cable splice shall be capable of providing the cable functions in an equivalent ambient environment as the original cable. The normal ambient conditions for underground cables include exposure to ground moisture, small water head, ambient temperatures of −40° C. to 50° C., emergency operation temperature exposure of 140° C., normal fill material and weather related field conditions.

When a splice in a jacketed or sheathed cable is made, the jacket is removed from both cables to be joined and the functional part of the cable is exposed. The functional part of the cable is joined together by whatever method is appropriate for the type of cable being joined and the jacket is replaced. Most of the methods of jacket replacement in the prior art are utility specific. Telecommunication cable splices are sealed with molded or shrinkable covers that use some form of cable anchor or block and are filled with encapsulant whereas power cables use shrinkable or resilient covers and occasionally encapsulated techniques. Power cable splices have been introduced and used to connect the functional elements of power cables, however the jacket or sheath of the cable is usually a separate step. There are several different methods for replacement of the cable jacket in the prior art including heat shrinkable tubes or wraparound sleeves, prestreched resilient elastomeric sleeves or adhesive tapes.

The heat shrink methods utilize shape memory cross-linked polymers that are extruded as tubes or sheets at a small diameter, heated to the crystalline melt temperature and distorted to larger diameters to allow installation over areas of uneven geometry. The craftperson then installs the article over the splice and applies sufficient heat to allow the material to attain the crystalline melt temperature. At this temperature, the heat shrinkable article attempts to recover the original shape or diameter and "shrinks" until it contacts a substrate larger than its original diameter. This method provides an excellent seal but is limited by the expansion ratio of the expanded part (typically 3/1) and requires a torch or other heat generation device which is often impractical for the installation environment.

Technologies that use prestreched resilient elastomeric materials also utilize the shape memory of a material but do not require a material phase transition and therefore do not require a heat source. In one embodiment of this method of sealing a splice, a tube of elastomeric material is extruded at a specific diameter and expanded to a larger diameter. The expanded part is then placed on a mandrel of collapsible material which is designed to be removed sequentially as the expanded tube collapses and attempts to recover its original shape. This method also provides a good seal but is prone to problems in the field due to interference of the collapsible material cord with objects that are within the sealed area and poor cold temperature performance. Other methods of utilizing an elastomeric material use a lubricant to allow installation on substrates that are larger than the diameter of the article and then rely on an interference fit for an environmental seal.

Thus, it would be highly desirable to use a preformed molded enclosure that replaces the function of the jacket of the cables and effectively seals the splice area without the requirement of a collapsible mandrel, special tools or a heat generation device. It is also desirable to use a resilient cross-linked mastic to seal the enclosure along the edges as well as in the cable to enclosure interface. It is further desirable to use adjustable fasteners that can be simply installed to provide pressure to hold the mating halves of the enclosure in contact with the edge sealing mastic and the enclosure in contact with the mastic at the cable jacket. This device could be designed with the capability of accepting a range of cable diameters for one size enclosure. This device could save time during the rejacketing process compared to encapsulants or heat shrinkable techniques.

SUMMARY OF THE INVENTION

The splice enclosure of the present invention provides for the previously cited desirable features as well as others that will be apparent to the skilled craftperson. In a preferred embodiment, the splice enclosure includes two semi-elliptical molded cover members that come together when the enclosure is hingedly closed to form a chamber with sufficient diameter to cover most commercially available medium voltage cable splices. At each end the splice enclosure tapers down to a smaller semi-cylindrical diameter to accommodate a seal at the jackets of the two cables which are spliced. The invention utilizes a cross-linked resilient mastic and interlocking grooves held in proximity by ratchet fasteners along the mating edges to provide a seal between the two halves described above which are joined at an integral edge with an axial living hinge. The hinge allows exact alignment of the two halves which are held in contact with the resilient mastic by the fasteners. Sealing cross-linked resilient mastic is wrapped around the cable jackets and seals the cover to the jacket. In a preferred embodiment, the enclosure provides a water resistant seal for a splice in jacketed cables and provides mechanical protection for same under the usual installation conditions. The invention is installed without the use of a collapsible mandrel and requires no special tools such as a torch to affect the seal. Various sizes of cable jackets can be used with each cover as the resilient mastic and the design of the enclosure allows a range of diameters to produce the seal. The invention is installed by applying mastic to the cable jackets, folding the hinged part around the cable splice area and snapping the ratchet fasteners together to rapidly seal the enclosure.

In one aspect, the present invention may be defined as a cable splice enclosure that includes the hinged cover portions and mastic material necessary to form the enclosed splice.

In another aspect, the present invention may be defined as the completed enclosed splice that includes two jacketed cables, a cable splice in which the conductor portions of the two cables are joined together and a hingedly closed clam-type housing that forms a splice-encasing cavity, a pair of cable ports and an uninterrupted mastic seal that fully envelops the cable splice and seals to the jacketed cables extending from each end of the splice.

BRIEF DESCRIPTION OF THE DRAWINGS

Some of the objects having been stated, other objects will appear as the description proceeds, when taken in connection with the accompanying drawings, in which

FIG. 3 is a plan view of the embodiment of FIGS. 1 and 2 after closing of the enclosure housing halves and illustrating the enclosure exterior.

FIG. 4 is an enlarged sectional view taken along the lines 4—4 of FIG. 3 viewing the seal at the cable jacket edge seal interface.

FIGS. 5 and 6 are enlarged sectional views taken along the lines of 5—5 and 6—6 of FIG. 3 illustrating the detail at the cable port seal and the edge seal, respectively.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
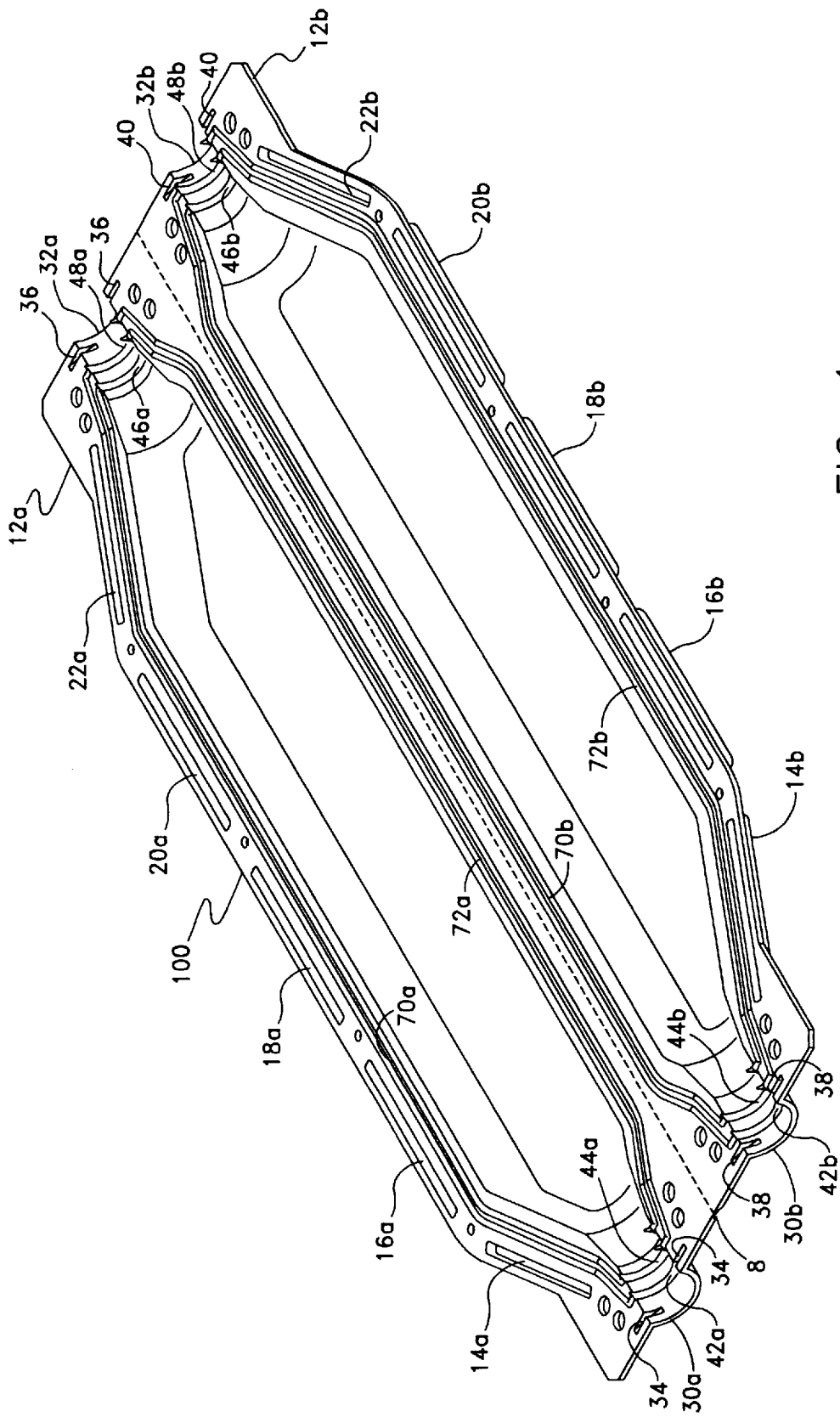
FIG. 1 is an isometric view of one embodiment of the invention with the edge sealing mastic and cable sealing mastic removed to facilitate illustration.
Figure 2:
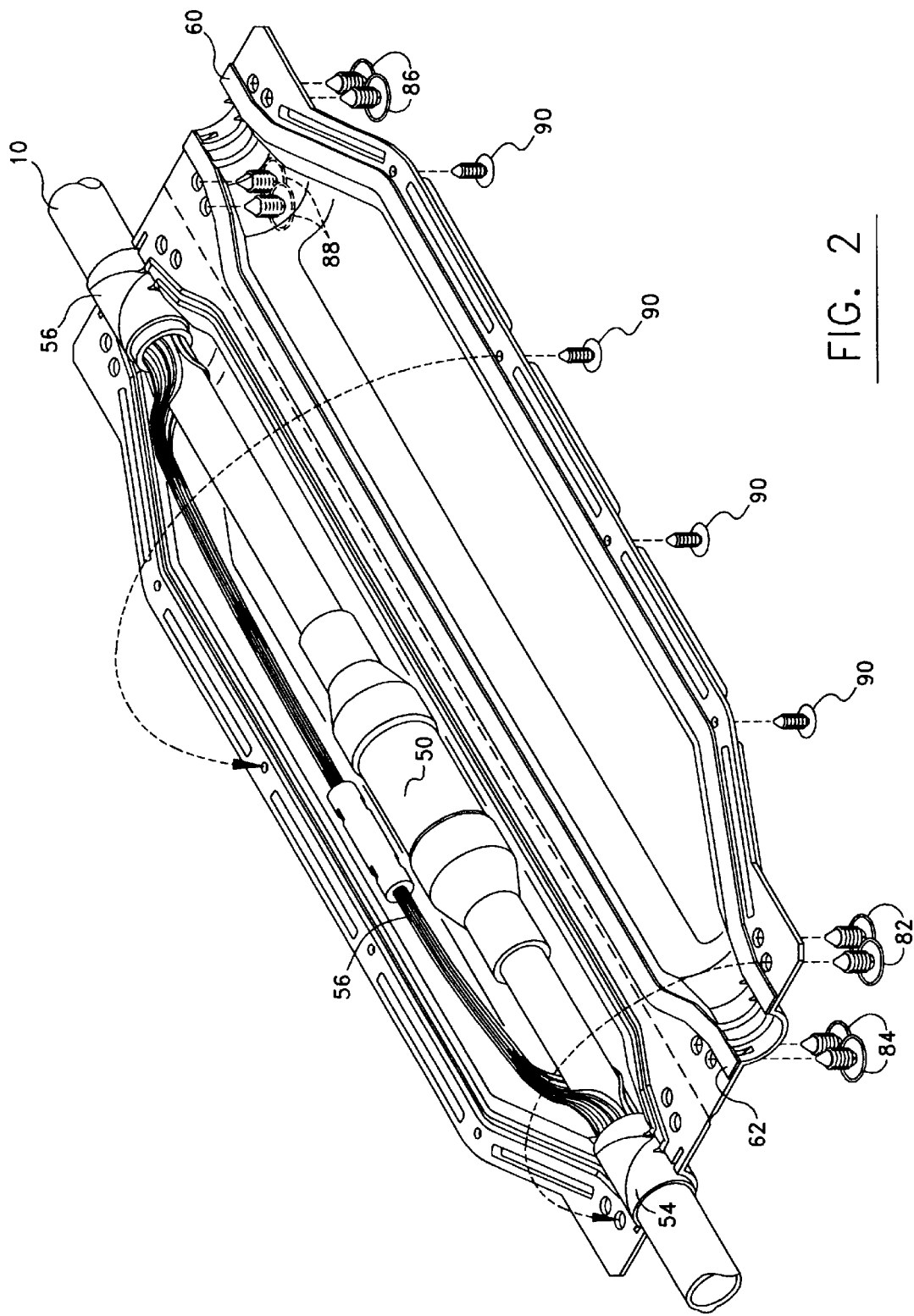
FIG. 2 is a view similar to FIG. 1 with a cable and cable splice in place and showing the edge sealing mastic and cable sealing mastic.
Figure 7:
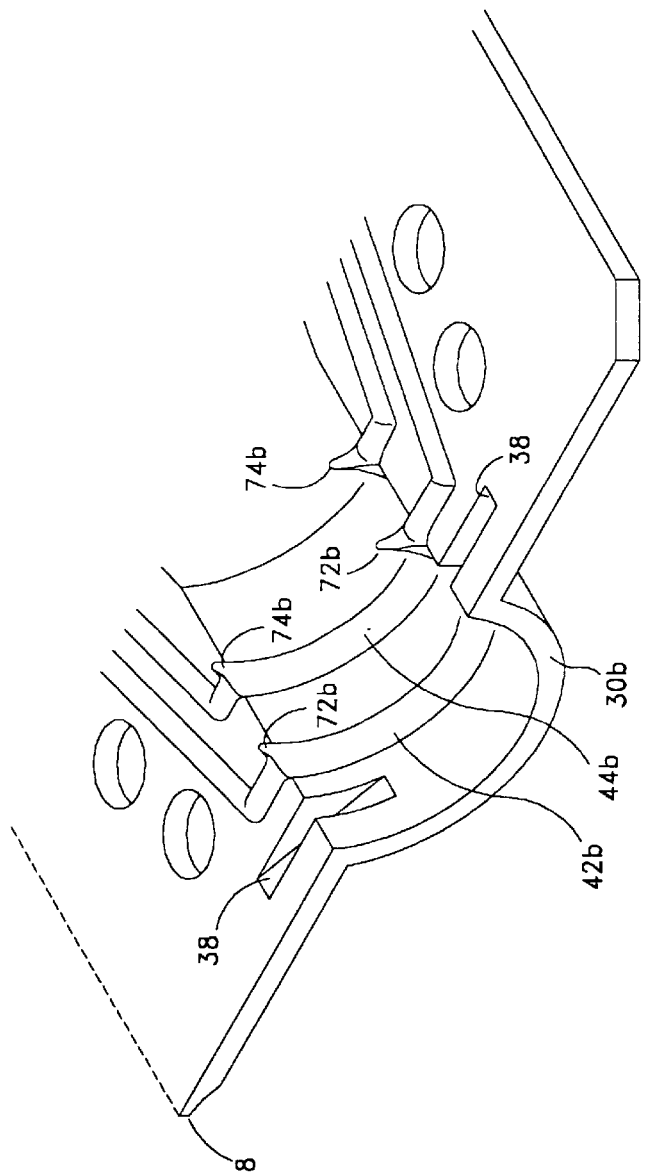
FIG. 7 is an enlarged isometric view of the recess in one housing half that forms one half of a cable port.

Referring to the drawings, and particularly to FIGS. 1 and 2, in one preferred embodiment the splice enclosure 100 of the invention includes a clam-type housing with two generally semi-elliptical molded halves 12a and 12b that are substantially mirror images. Halves 12a, 12b are joined by a longitudinally disposed living hinge 8 which is an extremely thin piece of the same material as each of the molded halves. Each half 12a, 12b has first and second ends and defines an elongate, centrally disposed cavity 13a, 13b. A half-cylindrical recess 30a, 30b, 32a, 32b is formed at each end of the elongate cavities 13a, 13b as a continuation of the cavities. An integral flange structure is formed in each housing half 12a, 12b by first inner longitudinal flanges 110a, 110b residing adjacent to hinge 8 and second outer longitudinal flanges 114a, 114b remote from the hinge. The flanges on each half define planar sealing faces that abut with the opposed sealing faces on the other housing half upon closure of the housing by swinging the two halves together about hinge 8. When the halves 12a, 12b are so closed (FIG. 4), the opposed cavities in the two halves form a central splice-encasing chamber 120 (FIG. 6) and the opposed recesses at each end form a pair of cable ports in which the jacketed cables extending from each end of the splice reside. In accordance with the invention, upon closure a continuous uninterrupted environmental seal fully envelops the splice and seals to the jacketed cables extending from each end of the splice.

There are two types of sealing surfaces which form together upon installation and closure of the invention that provide environmental sealing through the use of a cross linked, butyl rubber, resilient mastic in conjunction with fasteners. The first type of sealing surface is the edge sealing surface at the abutment of flanges 114a, 114b and 110a, 110b, respectively. The second type of sealing surface serves to seal the jacketed cables that reside in the cable ports. In this regard, the recesses 30a, 30b, 32a, 32b that form the cable port halves each contain two tapered extended semi-circular rib like protrusions 42a, 44a, 46a, 48a and 42b, 44b, 46b, 48b which rise above the planar surface of the cable ports and terminate as small nipples 72a, 74a, 76a, 78a and 72b, 74b, 76b, 78b. The nipples are longitudinally staggered, and when enclosure 100 is closed the nipples interlock in the fashion of a zipper. FIG. 4 shows this unique interlocking that occurs with the nipples at the enclosure mating plane to cable jacket junction which is an area that is particularly difficult to seal. The interlocked nipples force the resilient cable mastic 54, 56 into the interstice and effect the seal in this area with the cable mastic and edge sealing mastic adhered together. The overlapped area of the interlocked nipples provides the cable jacket range diameter capabilities as full engagement is not required for sealing. The ribbed protrusions continue from the cable port along the mating edges of each half as protrusions shown in FIG. 1 as 70a, 71a, 70b, 71b. These protrusions embed into the cable mastic 54 and 56 of FIG. 2 in the cable port region upon closure of the invention and further facilitate the environmental seal while allowing for a range of cable diameters that can vary by as much as 20% or larger.

The cross-linked butyl rubber resilient cable mastic 54 and 56 is provided in the enclosure kit as a 2" wide by 0.06" thick strip with release paper that is removed prior to wrapping around the cable. An example of an acceptable mastic for this application is Plioseal™ 408 Splice Tape from Ashland Chemical, PO Box 2219, Columbus, Ohio. 43216. The mastic has several properties that provides sufficient tack to affect a seal for the entire splice system and allow the use of polypropylene for the entire enclosure because of its affinity to this particular material. An additional property of this mastic is the range of thermal exposure that can be tolerated without flow due to the cross-linking process. The invention can operate in ambient environments of 90° C. and maintains integrity at cable conductor temperatures of 130° C. which is not uncommon for this application. The mastic is positioned at the cable port area and is designed to provide a diameter and thickness of sealant that links this cable port seal to the edge sealing mastic 60 and 62 of the invention as shown in FIG. 2. An acceptable edge sealing mastic is Plioseal™ 408 Splice Tape, 0.5" x0.105" from Ashland Chemical, PO Box 2219, Columbus, OHIO. 43216. The cavities of each half form a chamber when closed that allows sufficient room for a cable splice. In the illustrated embodiment (FIG. 2), the cable splice takes the form of a molded splice 50 that joins together the conductors of two distribution class jacketed cables and the splice 55 of the associated neutral conductors 52.

The installation of the invention is shown in FIG. 2. The semi-elliptical molded half mastic bearing side 12b is rotated about the axis of the living hinge 8 until full contact is made between the edge sealing mastic 60, 62 and the other semi-elliptical molded half 12a. In this regard, edge sealing mastic 62 initially resides on the planar sealing face of inner longitudinal flange 110b that is adjacent to hinge 8, while edge sealing mastic 60 resides on the planar sealing face of outer longitudinal flange 114b that is remote from the hinge. These flanges cooperate with flanges 110a, 110bon the opposed housing half 12a. The enclosure mating edge seal is facilitated during this closure by forcing the edge sealing cross linked butyl rubber resilient cable mastic into the small edge protrusions 70a, 71a, 70b, 71b. The mastic is compressed and is held in contact with the two surfaces by ratchet fasteners 90 or molded facsimiles. This edge seal is further shown in FIG. 6 with a cross sectional view of the enclosure at the central area and the seal at a typical edge area. The protrusions overlap and force the edge sealing mastic between the interstices formed by their mutual offset to maximize mastic contact and ensure a water-proof seal. Fasteners 90 are installed fully and provide the closing force needed to keep the edge sealing mastic in contact with the two halves. The mastic has very little compressibility due to the rigidity afforded by cross-linking and does not flow or form a liquid at operational temperatures of −40° C. to 130° C.

Referring to FIG. 2, ratchet fasteners are also incorporated to provide the force to keep the surface of the cable 10, cable mastic 54 and 56, and the edge sealant mastic 60 and 62 in contact. The fasteners have graduated or stepped flanges that allow for variation in thickness at the sealing planes. The fasteners are all installed and fully seated ensuring that the mating surfaces are in contact with the cross linked butyl rubber resilient mastic (FIG. 5).

With further reference to FIG. 2, the seal at the cable port area seal is provided by the aforementioned cable mastic in forced contact with the protrusions and held in contact by the fasteners 82, 84, 86, 88. These fasteners also provide forced contact between the cable mastic and the edge sealing mastic throughout the range of cable diameters that the invention is design to accommodate. The cable ports provide structural rigidity to the entire assembly as one problem that the invention mitigates is the extreme bending of the installed cable splice which violates the interference fit of the splice body to the cable semiconductive shielding layer and allows water or other environmental contaminates to enter the electrically active interior of the splice, causing failure.

Several strengthening members 14a, 16a, 18a, 20a, 22a and 14b, 16b, 18b, 20b, 22b add linear rigidity to the housing halves 12a, 12b at the flanges. The beams located at the entrance of the cable ports are structural elements 34, 36, 38, 40 adding considerable rigidity to the cable port halves 30a, 32a and 30b, 32b.

The preferred choice of materials for the housing of enclosure 100 is polypropylene due to its low moisture vapor transmission rate compared to most polymeric moldable plastics and the solvent resistance characteristics of this particular material. Other materials that may be used include polyethylene, nylon and similar impact resistant and environment resistant non-corroding materials which have hinging properties. The invention can be manufactured by thermoforming, injection molding or blow molding using appropriately shaped molds. Manufacturing economies are provided by the use of mold inserts that change the diameter of the cable ports to accommodate different sizes of cable. Three molds and six inserts can cover all cable sizes from 1.0" (25 mm) to 2.5" (65 mm).

After all fasteners are fully seated, the installation is complete and the invention can be immediately buried without waiting for encapsulants to harden or heated objects to cool.

While the invention has been described in connection with certain illustrated embodiments, it will be appreciated that modifications may be made without departing from the true spirit and scope of the invention.

That which is claimed is:

1. A cable splice enclosure for environmentally and physically enclosing a splice formed in a jacketed cable, said splice enclosure being characterized in use by the provision of a continuous, uninterrupted mastic seal that fully envelops the splice and seals to the jacketed cable extending from each end of the splice, said splice enclosure comprising:
    an elongate clam-type housing comprising two mating, substantially mirror image halves joined together by a hinge, each half defining first and second ends and having an elongate, centrally disposed cavity, a half-cylindrical recess at each end of the elongate cavity as a continuation of the cavity, and an integral flange structure adjacent the cavity formed by a first inner longitudinal flange residing adjacent to the hinge and a second outer longitudinal flange remote from the hinge with the flanges defining opposed planar sealing faces, such that upon closure of the housing by hingedly swinging the two halves together the cavities of the two halves become opposed to form a central splice-encasing chamber, the half cylindrical recesses of the two halves become opposed to form a cable port at each end of the housing and the planar sealing faces abut;
    a first amount of mastic seal material located on said planar sealing faces sufficient to provide two uninterrupted mastic seals between the respective inner and outer flanges of the two halves upon closure of the housing;
    fasteners for holding the respective inner and outer flanges of the two halves together with the mastic seal material therebetween in compression;
    each half-cylindrical recess including at least one semicircular rib protrusion that, in cooperation with a rib protrusion on the other half, encircles the jacketed cable residing in the cable port when the housing is closed;
    a second amount of mastic seal material for encircling a jacketed cable portion at each cable port in an area where said semicircular rib protrusions reside;
    whereby, in use, the seals between the semicircular rib protrusions and the jacketed cable and the uninterrupted mastic seals at said flanges provide a continuous, uninterrupted mastic seal that fully envelops the cable splice and seals to jacketed cables extending from each end of the splice.

2. The cable splice enclosure of claim 1 wherein at least one of said semicircular rib protrusions includes nipple extensions at the ends thereof for engaging the mastic sealing material on the adjacent inner and outer flanges.

3. The cable splice enclosure of claim 1 wherein each recess includes two of said semicircular rib protrusions.

4. The cable splice enclosure of claim 3 wherein at least some of the rib protrusions include nipple extensions at the ends thereof for engaging the mastic sealing material on the adjacent inner and outer flanges.

5. The cable splice enclosure of claim 1 wherein said housing halves are formed of polypropylene and the mastic material is a cross linked, butyl rubber, resilient mastic.

6. The cable splice enclosure of claim 1 wherein the housing halves are joined by a longitudinally disposed living hinge.

7. An environmentally and physically enclosed splice for two jacketed cables carrying distribution class voltage, said enclosed splice comprising:

two jacketed cables each of which includes a conductor, a neutral wire and a jacket, a cable splice in which the conductors of the two cables are joined together by a premolded splice and the neutral wires are joined together by a neutral splice located external of the premolded splice;

a molded elongate housing including two mirror image clam-type halves joined together about a longitudinally disposed living hinge, said housing including an elongate centrally disposed splice-encasing chamber formed by opposed cavities in the housing halves, a cable port at each end of said chamber formed by opposed half-cylindrical recesses in the housing halves, each cable port encasing one of the jacketed cables extending from the ends of the cable splice, and a pair of uninterrupted longitudinal seals formed by abutment of opposed flanges in the housing halves, a first pair of said abutted flanges residing adjacent to said living hinge and a second pair of said abutted flanges residing remote from the living hinge;

said uninterrupted longitudinal seals including uninterrupted mastic seal material between the abutted flanges, and fastener means for holding the mastic seal material in compression;

each half-cylindrical recess including at least one semicircular rib protrusion that, in cooperation with the rib protrusion on the opposite recess, encircles the jacketed cables residing in the cable port;

said mastic seal material encircling the jacketed cables at each cable port, and said rib protrusions being sealingly embedded in the mastic seal material;

whereby, the mastic seal material between the semicircular rib protrusions and the enclosed jacketed cables at the two cable ports and the pair of uninterrupted longitudinal mastic seals provide a continuous, uninterrupted mastic seal that fully envelops the premolded cable splice and the neutral splice and seals to the jacketed cables extending from each end of the splice.

8. The enclosed splice of claim 7 wherein at least one of said semicircular rib protrusions at each cable port includes nipple extensions at the ends thereof for engaging the mastic sealing material on the adjacent inner and outer flanges.

9. The enclosed splice of claim 7 wherein each half-cylindrical recess includes two of said semicircular rib protrusions.

10. The enclosed splice of claim 9 wherein at least some of the rib protrusions include nipple extensions at the ends thereof for engaging the mastic sealing material on the adjacent inner and outer flanges.

11. The enclosed splice of claim 7 wherein said housing halves are formed of polypropylene and the mastic material is a cross linked, butyl rubber, resilient mastic.

12. The enclosed splice of claim 7 wherein the housing halves are joined by a longitudinally disposed living hinge.

13. An environmentally and physically enclosed splice for two jacketed cables, said enclosed splice comprising:

two jacketed cables each of which includes a conductor portion;

a cable splice in which the conductor portions of the two cables are joined together;

a molded elongate housing including two mirror image clam-type halves joined together about a longitudinally disposed living hinge, said housing including an elongate centrally disposed splice-encasing chamber formed by opposed cavities in the housing halves, a cable port at each end of said chamber formed by opposed half-cylindrical recesses in the housing halves, each cable port encasing one of the jacketed cables extending from the ends of the cable splice, and a pair of uninterrupted longitudinal seals formed by said abutment of opposed flanges in the housing halves, a first pair of said abutted flanges residing adjacent to said living hinge and a second pair of abutted flanges residing remote from the living hinge;

said uninterrupted longitudinal seals including uninterrupted mastic seal material between the abutted flanges, and fastener means for holding the mastic seal material in compression;

each half-cylindrical recess including at least one semicircular rib protrusion that, in cooperation with the rib protrusion on the opposite recess, encircles the jacketed cables residing in the cable port;

said mastic seal material encircling the jacketed cables at each cable port, and said rib protrusions being sealingly embedded in the mastic seal material;

whereby, the mastic seal material between the semicircular rib protrusions and the enclosed jacketed cables at the two cable ports and the pair of uninterrupted longitudinal mastic seals provide a continuous, uninterrupted mastic seal that fully envelops the cable splice and seals to the jacketed cables extending from each end of the splice.

\* \* \* \* \*